US006255102B1

(12) United States Patent
Hallsten

(10) Patent No.: US 6,255,102 B1
(45) Date of Patent: Jul. 3, 2001

(54) MODULAR SUPPORT FOR BIOFILTRATION

(75) Inventor: Jeffrey A. Hallsten, Sacramento, CA (US)

(73) Assignee: Hallsten Corporation, Sacramento, CA (US)

( * ) Notice: Subject to any disclaimer, the term of this patent is extended or adjusted under 35 U.S.C. 154(b) by 0 days.

(21) Appl. No.: 09/551,516

(22) Filed: Apr. 18, 2000

Related U.S. Application Data

(63) Continuation of application No. 09/248,775, filed on Feb. 12, 1999, now abandoned.

(51) Int. Cl.$^7$ .................................................. C12M 1/16
(52) U.S. Cl. ................................. 435/299.1; 435/290.1; 435/294.1; 34/237; 55/358; 55/494
(58) Field of Search ............................. 435/290.1, 291.3, 435/294.1, 297.2, 299.1; 55/358, 494, 501, 515; 34/237–239; 422/211, 239; 210/498, 499; 248/346.3

(56) References Cited

U.S. PATENT DOCUMENTS

| | | | |
|---|---|---|---|
| 1,386,443 | * | 8/1921 | Steere . |
| 4,667,420 | * | 5/1987 | Amelung et al. . |
| 5,454,195 | | 10/1995 | Hallsten . |
| 5,821,114 | * | 10/1998 | Barshter et al. . |
| 5,891,711 | * | 4/1999 | Carter . |

FOREIGN PATENT DOCUMENTS 44 40 464 * 6/1996 (DE) .

OTHER PUBLICATIONS

Spang, Bernhard, "Biofilter Equipment and Design", Mar. 16, 1998 3 pgs., Chemengineer.guide@ miningco.com.
"Module 8: Biological Treatment of Air Pollution", Sep. 9, 1998, 4 pgs., http://bigmac.civil.mtv.edu/.../lecture6.html.
Spang, Bernhard, "AirPollution Control by Biofilters and Broscrubbers", Mar. 9, 1998, 3 pgs., chemengineer.guide@miningco.com.
Anit, Selvi B. & Robert J. Artuz, "Biofiltration of Air", pp. 1–7. (Sep. 9, 1998).
Hombach, H. Peter and Don V. Mathsen, "Biological Waste Air Purification", Biofilter, rel. 5, Apr. 1996.
EG & G Biofiltration, Biocube™ Aerobic Biofilter, 2 pg. brochure (No Date Provided).
EG & G Biofiltration, Off–gas Control System, 2 pg. Brochure (No Date Provided).
EG & G Biofiltration, Environmentally Benign Biofiltration System for the Reduction of VOCS and Complex Odors, 8 pgs. (1994).
EG & G Biofiltration, Biocube™ Odor Control Systems The Natural Solution to Odor Control, 6 pgs ( No Date Provided).

* cited by examiner

Primary Examiner—William H. Beisner
(74) Attorney, Agent, or Firm—Thomas M. Freiburger

(57) ABSTRACT

A modular biofiltration support system is quickly erectable in virtually any size and shape using plastic modules that are interconnected at the site. Included in the system are bed platform modules which assemble together to form a bed platform to support the weight of the biofilter medium within the area defined by the frame, and a multiplicity of bed support legs which are assembled into the bed platform modules to hold the bed platform at a raised position above the ground, defining a plenum for entering gases, between the ground and the bed platform. In one embodiment, at least some of the legs include air directing vanes which can be oriented in positions to cause generally even distribution of the gases within the plenum. The bed platform modules have openings to direct the gases to flow upwardly through the biofilter medium. The periphery of the plenum within the bed platform preferably is substantially closed, and this can be by taller peripheral modules in one embodiment, or by angled edge platform modules in another embodiment, that form a slope from the bed platform down to the ground or base.

30 Claims, 11 Drawing Sheets

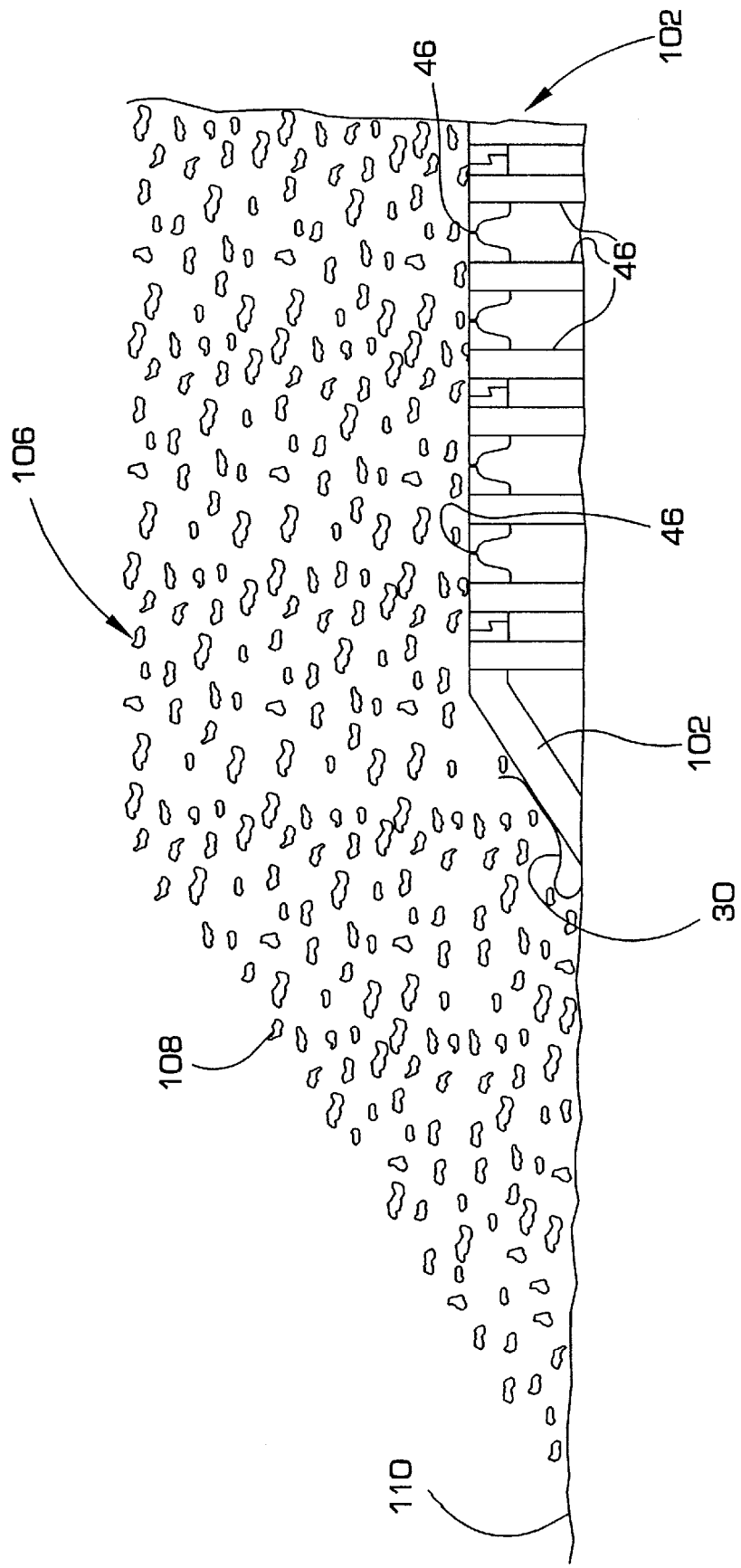

MODULAR SUPPORT FOR BIOFILTRATION

This is a continuation of application Ser. No. 09/248,775 filed Feb. 12, 1999, now abandoned.

BACKGROUND OF THE INVENTION

The invention concerns removal of noxious odors and components from gases given off by a sewage treatment facility. More specifically, the invention concerns a modular support system for erecting a biofiltration support bed in virtually any size and shape desired.

Biological air pollution control has been used on an increasing basis in recent years to cleanse noxious and odorous gases, such as those emanating from a sewage treatment plant. The biological filtration systems, or biofilters utilize a bed of stacked biofilter material such as compost, tree bark, peat, heather or soil, generally about three feet or more deep. The containment gas from the sewage treatment plant or other sources is blown through the biofilter material in an upward direction. The material in the biofiltration bed provides an environment for a diverse culture of microorganisms, which degrade the gaseous pollutants as they pass through the biofilter.

Such biofiltration or biological treatment of the gases is an inexpensive treatment method, but the raw gas stream must generally meet certain conditions: The pollutants should be water soluble and biodegradable, and free of toxic components. Also, there must be sufficient concentration of oxygen. Further, the gas stream should nearly saturated with water (relative humidity at least about 95%), and at temperature between about 40° F. and 140° F. (more preferably between 50° F. and 100° F.). The odorous gas must also contain no more than small amounts of dust and grease.

These requirements usually dictate that the raw gas be preconditioned before entering into the biofilter bed. Preconditioning includes humidification, temperature control and removal of particulates.

In the biofilter itself, a biofilm covers the substrate of tree bark, peat, heather, etc. Water soluble air pollutants are absorbed into the biofilm and decomposed into carbon dioxide and water by the microbes. The filter beds are often built on a single level, but where area is limited, multiple level biofilters have been constructed, with the raw gas stream divided and fed in parallel to the various levels of the biofilter system.

Regarding sizing of the biofilter beds, the height of the filter bed, i.e. the stack of organic material as the medium, is generally in the range of about 1½ feet to 5 feet. Areas are up to tens of thousands of square feet. One rule of thumb regarding the calculation of needed area for a given waste air flow is that the "area load" or ratio between the waste gas flow rate and the filter area should be in the range of about 2.5 to 3.0 CFM/SF. The flow distribution and humidity of the inlet gas have to be carefully controlled, otherwise the filter bed will eventually clog and cease to function. Distribution throughout the area of the filter bed should be relatively even.

In addition to sewage treatment plants, biofilters are useful for treating the effluent gases from many other processes. These include factory farming, rendering plants, coffee roasters, foundries, composting plants, kraft paper drying and paint shops. The odorous emissions treatable include ammonia, hydrogen sulfide, amines, aldehydes, mercaptains, alcohols, disulfides, esters, fatty acids, unsaturated hydrocarbons, ketones, hexane, dichloromethane, formaldehyde, phenol, organic acids, acetone, toluene and others.

These biofilter systems are being used increasingly in treating the gases from sewage treatment processes and also some of the other processes listed above. There is a need for a relatively simple, inexpensive and modular approach for constructing a filter bed support for such biofilters.

Hallsten U.S. Pat. No. 5,454,195 discloses a modular containment system for preventing hazardous materials from leaching into the ground or otherwise escaping a defined containment area. That system includes peripheral modules and a liner to define the containment area, the modules being fillable by water or granular material, and the system has some relevance to the present invention described below.

SUMMARY OF THE INVENTION

The invention provides a very efficient and relatively inexpensive solution to erection of a biofilter support bed of desired area, on a single level or, in another embodiment, on multiple stacked levels. The system consists of modular components, quickly assembled on a flat site which may be unpaved ground, and with capability to produce many different sizes and rectangular shapes, as well as areas, of a filter bed support to retain and confine a biofilter medium.

The system of modules for construction of the support apparatus includes a series of peripheral modules or berm modules with means for assembling the modules end-to-end to form a free-standing peripheral frame surrounding a filtering area. A multiplicity of polygonal bed platform modules with generally planar top surfaces are shaped to be arranged side-by-side contiguously to cover the entire filtering area within the peripheral frame. In the bottom side of each bed platform module are leg-receiving recesses. At least some of the bed platform modules are perforated so as to allow gas to pass vertically through.

On the interior sides of the peripheral modules are module support means for engaging with and supporting edges of the bed platform modules to thereby provide partial support for those platform modules positioned at the periphery of the filtering area and adjacent to the peripheral frame. The system includes bed support legs having upper ends sized and shaped to be closely received in the leg-receiving recesses in the bottom sides of the bed platform modules, and of length sufficient to support and elevate the bed platform modules above a base surface, thus forming a plenum under the bed platform modules. The legs are assembled on-site into the platform modules.

The peripheral modules are substantially taller than the bed support legs, so that the assembled modular support apparatus forms a large open-topped tray for supporting the bed of biofilter medium, with the peripheral frame extending above the support surface to contain the bed and with the plenum below the support surface and also bordered by the peripheral frame.

In a preferred embodiment the module support means on the peripheral modules comprises a horizontally extending recess or slot in the interior side of each peripheral module, of a size to receive an edge of a bed platform module. Accordingly, no support legs are needed near the outer edges of the bed platform modules which are adjacent to the peripheral frame.

Since distribution of the gases in a relatively even manner throughout the area of the biofilter medium is important to efficiency of the process, the invention in one specific embodiment has vanes secured to at least some of the bed support legs within the plenum under the support bed, and these vanes are adjustable in orientation such that they can be oriented to direct gases to achieve a generally even distribution. To avoid collection of gas toward the periphery of the plenum, and to prevent gas flow up along the peripheral module walls (avoiding treatment), the outermost bed platform modules, those adjacent to and in contact with the peripheral frame, may be provided without perforations, or with reduced perforations.

To seal the gas plenum against the ground and against leakage at the peripheral frame, the system preferably includes a substantially gas-impermeable liner which lies on the ground or slab and on which the legs rest supporting the bed platform modules. The peripheral modules also rest on the liner, and in a preferred embodiment, these modules have a vertical slot extending up from the bottom side in such a way as to form a substantially continuous slot around the periphery, the liner being forced up into this slot or recess by a liner retainer block which is press fit against the liner and into the slot or recess. The peripheral modules are hollow and fillable with water or granular material, and when filled, they improve the seal with the liner.

One situation where the modular system of the invention is particularly advantageous is when a relatively large biofiltration system is to be erected to treat a particular effluent. Generally in prior biofiltration system installation, a small pilot biofilter has been erected first, to treat the effluent of the noxious or odorous gas and determine frequent effectiveness. With the system of the invention, a very small biofiltration unit can be first erected to test the efficacy of the system; then the same modules and additional modules can be put together to build the full system as needed. The smaller initial system can also help confirm design size needed.

The system of the invention can also be used for composting. The modular components for this purpose are the same. A bed of organic material to be composted is placed on the support platform formed by the platform modules. Air is drawn out of the plenum, thus drawing air down through the compost bed, at a slow rate.

In another embodiment the peripheral modules are not employed. The bed platform modules can simply be assembled into a filter bed platform, again forming a plenum beneath, into which noxious or odorous gases can be delivered for passage up through the bed platform and through a biofiltration medium. At edges of the plenum, the biofilter medium can simply be piled over the sides of the platform, sloping down to the ground or base and thus substantially closing the plenum and allowing gases to pass up through the filter medium at the edges. Alternately, the filter platform can be erected in a recessed space, such as a shallow excavation in the ground or on a flat surface but with a dirt berm or other material surrounding the filter bed platform at its edges. Again, the biofilter medium can be stacked on the platform and can slope down to the ground or the berm beyond the edges.

Preferably the filter bed platform has some form of substantial closure device around the periphery. This can be comprised of sloping edge platform modules, which interconnect with the edges of the bed platform modules at the periphery, and preferably around all sides. These edge platform modules, like the regular bed platform modules, can include perforations for passage of gases up through the filtering medium.

The invention thus achieves an inexpensive, rapidly erected modular support system for biofiltration or composting, that can be erected quickly and adjusted to specifications. These and other objects, advantages and features of the invention will apparent from the following description of a preferred embodiment, considered along with the accompanying drawings.

DESCRIPTION OF THE DRAWINGS

FIG. 8 is a schematic sectional elevation view showing the system of FIG. 7, supporting a bed of biofiltration medium.

DESCRIPTION OF PREFERRED EMBODIMENTS

Figure 1:
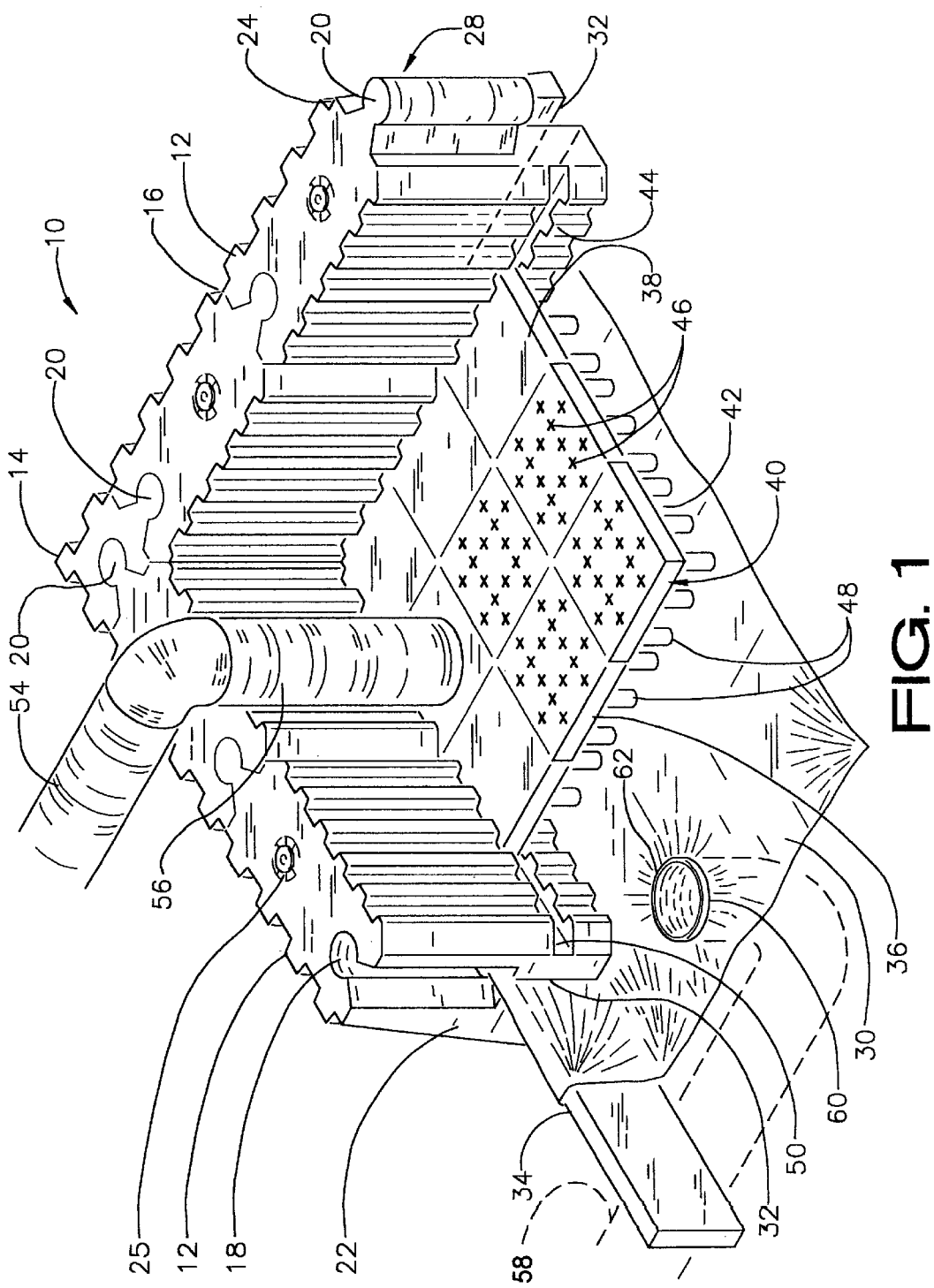
FIG. 1 is a perspective view showing a portion of an erected modular support system for the filter medium of a biofiltration system, in accordance with the invention.

FIG. 1 shows a portion of a modular support system 10 for a biofiltration system used to filter and treat noxious or odorous gases. The modular system includes peripheral modules 12, including corner peripheral modules 14, which are field-erected and secured together by interlocking devices 16 that include a generally vertically oriented socket 18 on one end of a module and a mating dowel 20 at first and second ends 22 and 24 of the modules, respectively, interfitted together by vertically arranging and lowering one module down against another to seat the dowel 20 in the socket 18. In a preferred embodiment the dowels and sockets are generally cylindrical. The dowels and sockets are closely sized so as to prevent rotation between the connected modules about a vertical axis and to provide a stable and close connection between adjacent modules, so that the assembled modules act as a unified peripheral frame.

Each of the peripheral modules 12 or 14 preferably is hollow, and may be formed by rotocasting polyethylene or polypropylene, polypropylene generally being more heat resistant (the biofiltration process generates heat). The modules are thus fillable with water, other liquid or pourable particulate material such as sand. Access holes with caps 25 are provided for this purpose.

Figure 2:
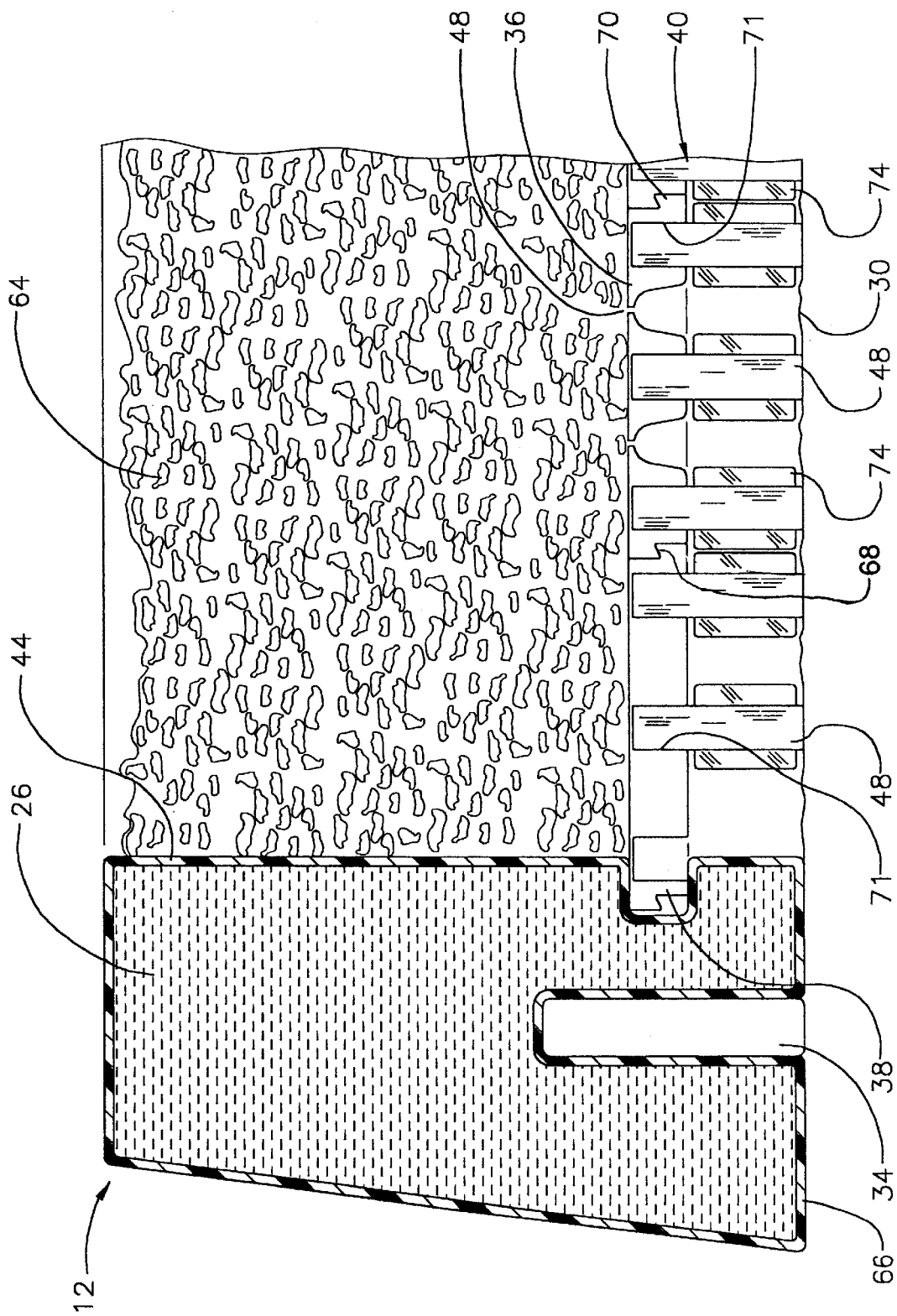
FIG. 2 is a sectional elevation view showing a portion of the support system and paned filter medium, including a peripheral module at the edge of the support apparatus.

FIG. 2 shows a peripheral module 12 in cross section, showing a liquid 26 such as water filling the module.

The peripheral frame 28 formed by the assembled peripheral modules 12 and 14 (only a portion of the frame being shown in FIG. 1) may rest on a poured slab or other pavement, or on relatively level ground. The interior space formed by the peripheral frame should be isolated from the ground, and this is achieved by a liner 30 as shown in FIG. 1. The liner may be approximately 30-mil thick polyethylene and lies on the ground and under the peripheral frame 28. It is preferably sealed substantially gas tight against the peripheral frame, and this may be achieved by a deep slot or recess 32 extending up into the bottom of each peripheral module 12 and 14, into which the liner is placed. A sealing block 34 is press-fit up into the liner in the slot to form the substantially gas-tight connection. When the frame modules 12 are filled, the weight puts increased pressure against the top and sides of the sealing block 34, improving the seal.

FIG. 1 also shows a series of bed platform modules 36 and 38 assembled preferably in a grid like manner as shown to form a planar support bed 40 for a filter medium to be contained on the bed and within the confines of the peripheral frame 28. These bed platform modules 36, 38 are closely adjacent or interconnected and define below the support bed a gas plenum 42, confined by the liner 30 and the interior walls 44 of the peripheral modules 12. As shown, the modules 36 have openings 46 for delivery of the noxious or odorous gas up from the plenum 42 and through the bed of filter medium for biofiltration treatment.

FIG. 1 also shows bed support legs 48 supporting the platform modules 36 and 38. At the outermost bed platform modules 38, which are adjacent to the peripheral frame 28, these bed platform modules 38 preferably interconnect with the peripheral modules 12 for support, as the figure illustrates. Support is provided by the edges of the modules 38 extending into a horizontally extending recess 50 formed on the inner side of all peripheral modules 12. In the system as shown, the corner peripheral module 14 does not have a face extending to the interior filter medium containment area, and in the form shown, the corner module 14 need not have a horizontal recess 50. If corner modules are made larger so as to have faces in the interior of the filtering area, then such corner modules would also have recesses similar to the recesses 50. The bed platform modules 38 are received relatively closely within the recess 50 so as to form a solid connection between the support bed 40 and the peripheral frame 28.

The platform modules 38 are shown without any gas openings 46. This is for two reasons: to aid in the even distribution of the gas within the plenum 42, with the goal of a balanced distribution of gas flow through the medium; and to prevent gas from flowing up along the interior walls 44 of the peripheral frame 28, between the filter medium and the frame, thus escaping biofiltration treatment.

FIG. 1 also shows two different arrangements for introduction of gas into the plenum 42 formed underneath the platform bed 40. In one arrangement, a conduit 54 of appropriate diameter for the design flow rate of gas enters from above the top of the peripheral frame 28, piping the gas down through a vertical portion 56 and through one of the non-perforated bed platform modules 38, through a hole (not shown) the size of the conduit. The conduit is large enough so as not to require excessive flow velocity on entry of the plenum 42 which might interfere with achieving the desired generally even flow distribution within the plenum 42. Another arrangement is shown in dashed lines 58 in the drawing, where a conduit is placed underground (or under a slab), emerging through the liner 30, as shown at 60, the end of the conduit being appropriately sealed against the liner, as by a band 62 tightening the liner against the outside surface of the conduit.

As noted above, the modular support system can be used for composting, with air flow in the reverse direction. Organic material for composting is loaded onto the bed platform 40 and air is withdrawn at a low flow rate via the conduit 54 or 58. Exhaust air can be put through a scrubber if desired.

FIG. 2 shows a portion of the erected system 10 in cross section, and also showing a bed of stacked filter medium 64, which may be bark or other organic material. As indicated, the medium 64 can be piled virtually to the top of the inner wall 44 of the peripheral modules 12. In this exemplary embodiment, the peripheral modules are about four feet tall, with the tops of the bed platform modules 36, 38 being at about one foot. This leaves a depth of three feet for the biofilter material 64. Each peripheral module 12 may be about four feet in length, and 18 inches wide at the base 66, seen in FIG. 2. The module may be tapered as shown, for increased stability.

Figure 3:
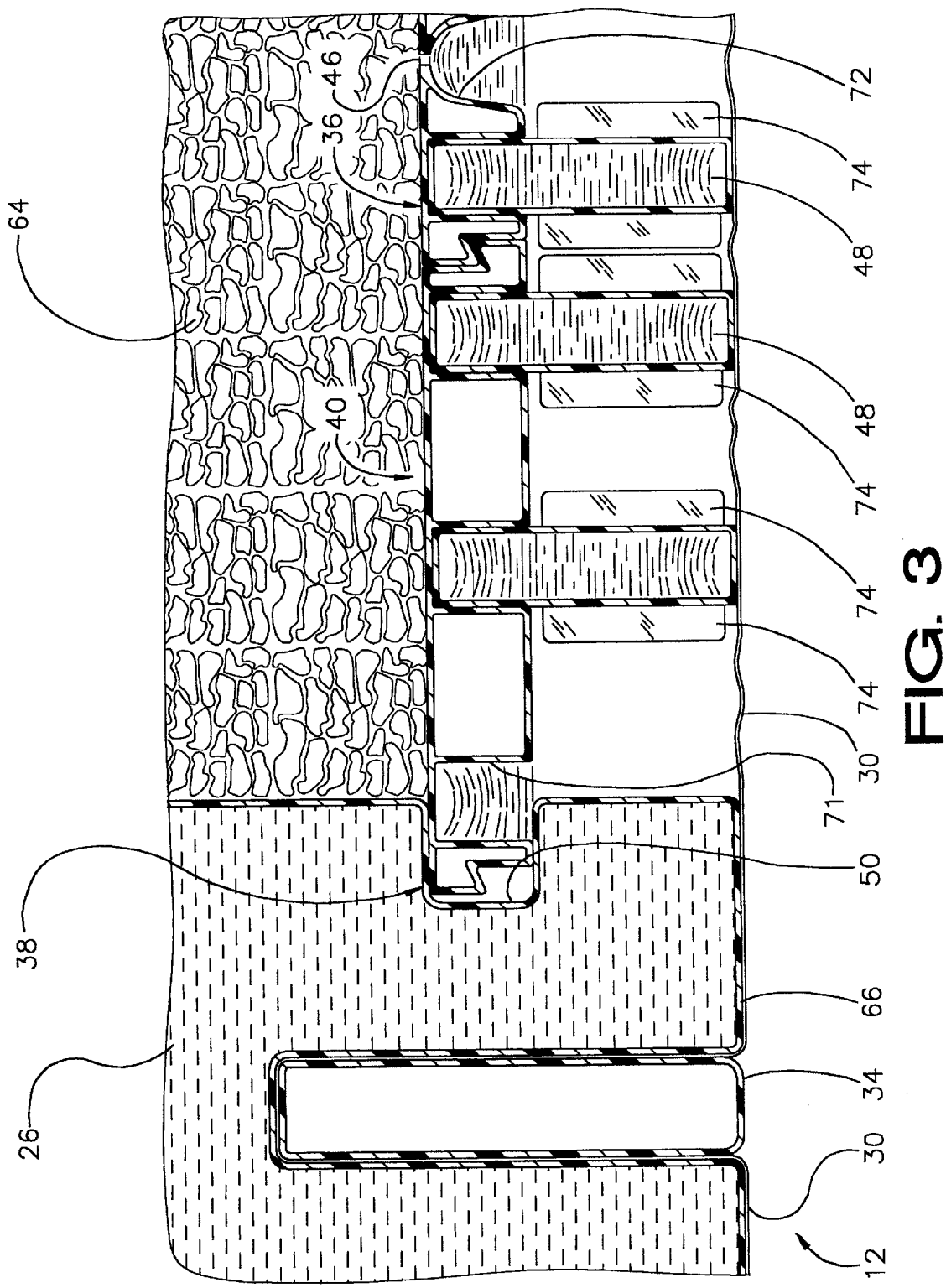
FIG. 3 is an enlarged, more detailed sectional view showing a portion of a peripheral module, a liner and other bed support apparatus.

FIG. 2 also shows that the bed platform modules 36 and 38 are interconnected side by side, a feature seen in better detail in FIG. 3. In a preferred embodiment the edges of each bed platform module have a hooked flange, oriented either upwardly or downwardly as shown, each bed platform module having two adjacent edges which hook downwardly and another two adjacent edges, opposite the first two adjacent edges, hooked upwardly. In the sectional views of FIGS. 2 and 3, the downwardly hooked flanges 68 are shown on left sides of the modules or the upwardly hooked flanges 70 are shown on right sides of the modules. This interlocks the adjacent modules and adds to the integrity of the system.

FIGS. 2 and 3 also show in greater detail the extension of the bed platform modules 38 into the horizontal slot or recess 50 in the interior wall of the peripheral frame, i.e. of each peripheral module 12. The depth (height dimension) of the bed platform modules 38 is preferably selected so as to fit closely within the horizontal recess 50. It may be about four inches.

FIGS. 2 and 3 also show the legs 48, which fit closely into leg receiving sockets or recesses 71 formed in the bottoms of the bed support modules 36, 38.

It is important that the support bed 40 of the system can support considerable weight. In large-area biofilter systems, small earth-moving equipment is often used to place the filter material 64 on the support bed. The bed platform modules 36 and 38 may be each about two feet by two feet in size, and molded of polyethylene, approximately 0.15 inch thick. Preferably an egg-crate type design is used, as indicated in FIGS. 2 and 3, with support arches 72 bridging the space between support legs 48, as shown. The system depicted in FIGS. 2 and 3 can support about 10,000 lbs. over a four square foot area.

FIGS. 2 and 3 additionally show directional vanes 74 connected to the support legs 48. The vanes, which can be oriented appropriately to generally evenly distribute the gas within the plenum under the support bed 40, may be connected to the legs by holding integrally with the legs (as shown), or they can be attached, as by having a collar which fits over the leg. Pairs of vanes on a leg are preferably at 180°-opposed locations, as shown.

Figure 4:
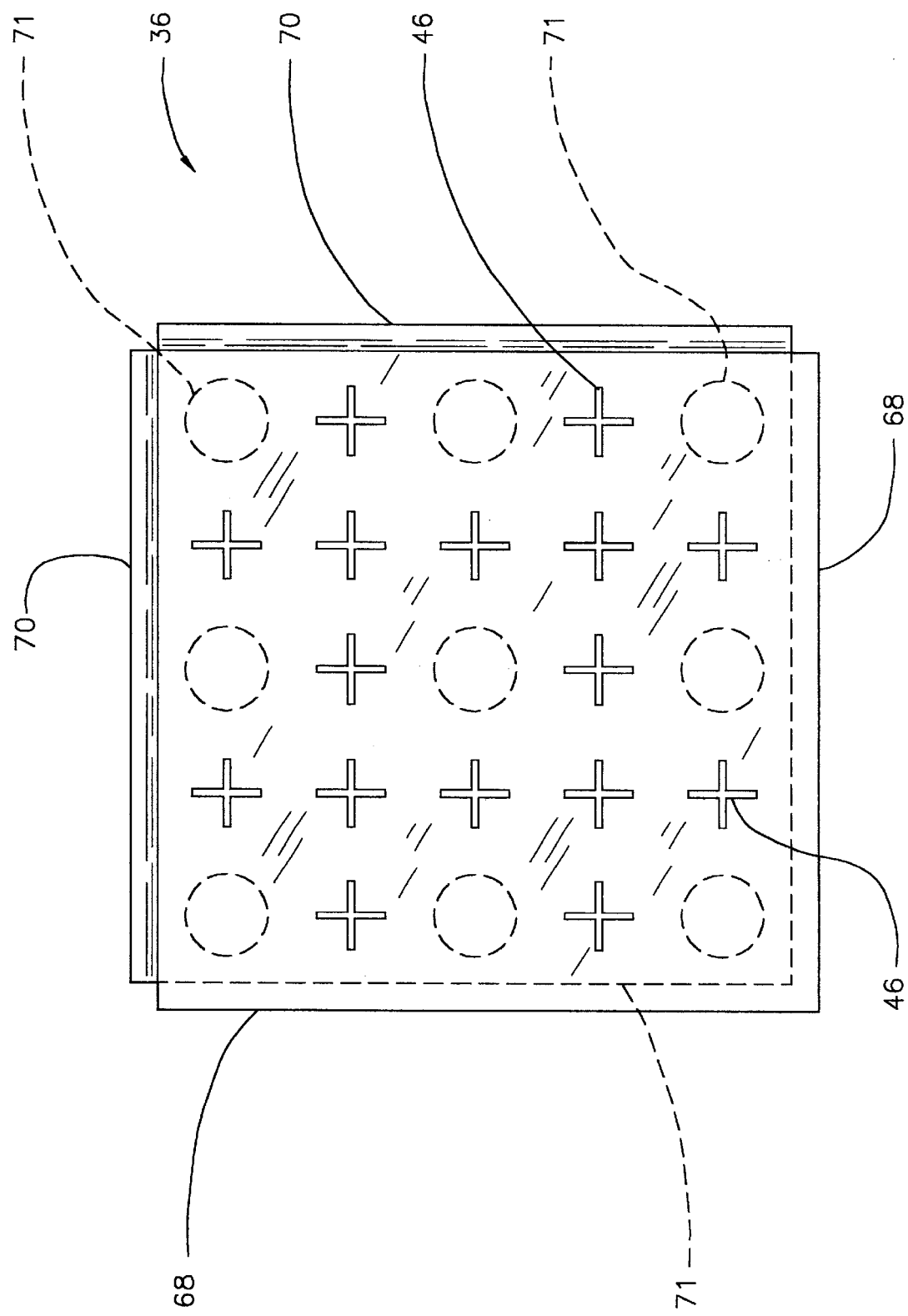
FIG. 4 is a plan view showing a bed platform module.

FIG. 4 shows in plan view one of the bed platform modules 36. The leg supporting recesses 71 are indicated in dashed lines beneath the surface, extending toward the bottom of the module, and the flanges 68 and 70 for interlocking with adjacent modules are also indicated.

The gas openings 46 are shown in X shape in accordance with a preferred embodiment, distributed on a two foot square module 36. It has been found that openings of this X-shape, formed of slots about ¼ inch wide for a typical system having bark as a filter medium, tend not to clog during use. The size and frequency of these X-shaped gas openings 46 is selected so as to add virtually no additional pressure head loss to the gas flow, beyond that already introduced by the filter medium 64 itself. Thus, in a preferred embodiment these openings add almost nothing to the head loss of the gas, beyond that introduced by the required movement of the gases throughout the plenum and up through the filter medium. As one example of a system of the invention, 5,000 cubic feet per minute (CFM) gas is introduced via an 18-inch duct 54. The gas is ducted into a 40 foot by 50 foot plenum 42, approximately 8 inches in height. With the illustrated arrangement and the gas openings 46 as shown in FIG. 4, the support bed 40 has about 5088 vents, and with equal flow, this would be 0.983 CFM per vent 46. If each vent opening has an area of 0.0082 square feet, the flow rate through each vent would be only about 119 feet per minute. This compares to the flow through the 18 inch duct of about 2830 FPM. Thus, the velocity pressure across the vent penetrations is so low as to be nearly negligible in calculation of head loss.

Figure 5:
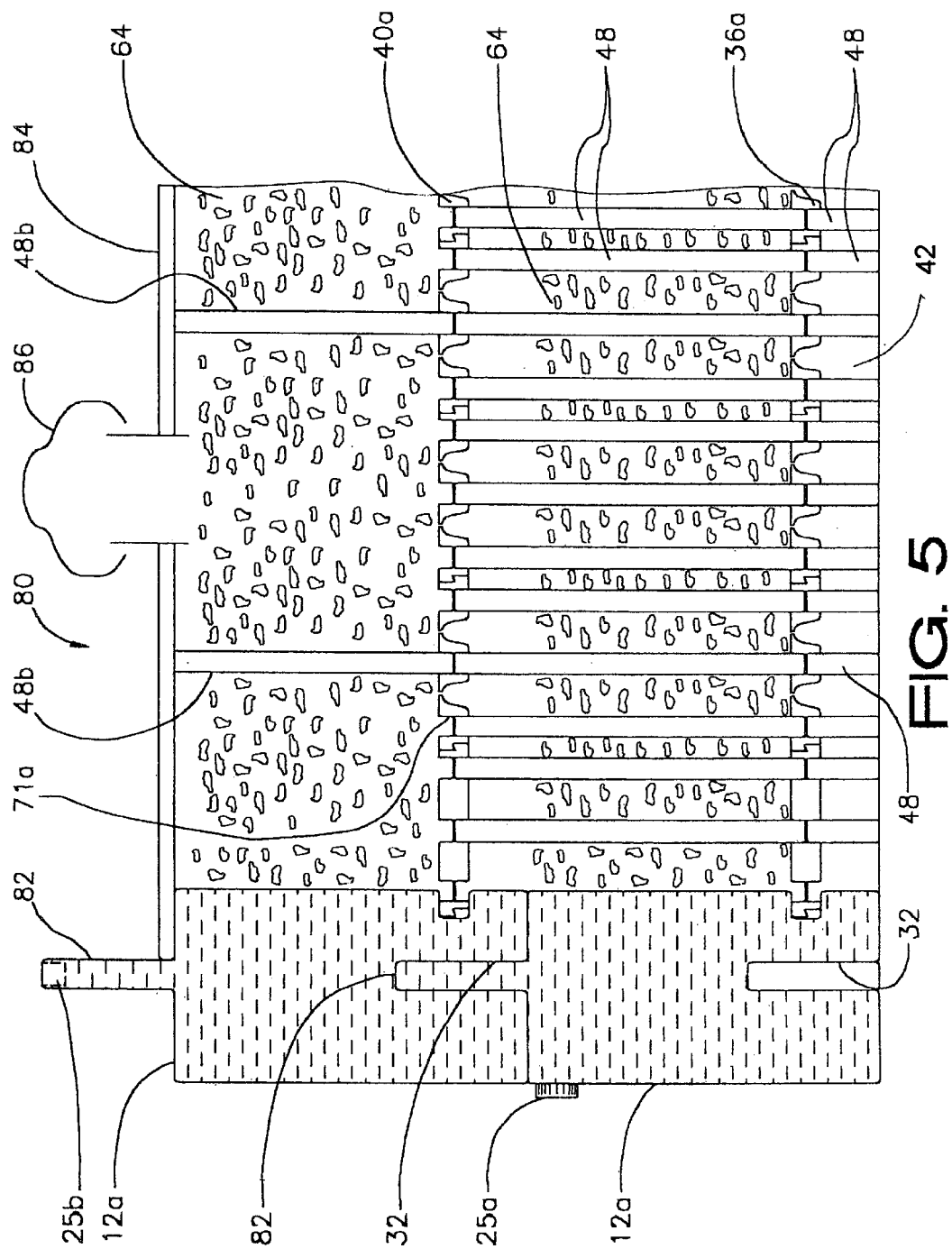
FIG. 5 is a schematic sectional elevation view showing a multi-level modular biofiltration system.

FIG. 5 shows a stackable modular system 80 according to the invention. In the illustrated version two layers of biofilter medium 64 are shown. Additional layers are possible.

In the illustrated system, peripheral modules 12a are in a modified form, having a vertical flange 82 at top, to fit closely into the slot like opening 32 formed in the bottom of a module 12a above. In this case the bed platform modules are also somewhat modified, in order to receive support legs 48a as shown. The legs 48a are considerably longer than the first-level legs 48, since they define a height for the entire first bed of biofilter material 64. A multiplicity of legs is shown in this embodiment, relatively closely spaced, for the case in which heavy equipment is to be supported on the upper support bed 40a.

A cover 84 is shown over the top level of biofilter material, for containment of gases, and a gas vent 86 is shown schematically. The cover 84 rests on the peripheral modules 12a, as well as being supported by a relatively small number of support legs 48b. Such a cover can be included on the first embodiment of FIGS. 1–4, if desired.

As can be seen from FIG. 5, the modified bed platform modules 36a have leg sockets 71a at both top and bottom, with a layer of structural material of the module extending between the top and bottom sockets.

In the stackable peripheral modules 12a, the tops of these modules in many cases are covered by the next-level modules. Access for filling the modules may be via a relocated fill opening and cap 25a, at a high location on the outer side of the module 12a. Alternatively, the fill openings can still be on tops of the modules, as shown at 25b but of low profile, and the lower-level modules 12a can be filled when the first level has been erected, followed by stacking the second level on the first. The fittings 25b can be flush fittings, spin welded into an opening in the top of the flange 82 after the unit has been roto-molded.

Gas can be introduced to the plenum 42 below the bottom level in the same manner as shown in FIG. 1, i.e. via a conduit similar to the conduit 58. Flow through the two layers of biofiltration medium 64 can be in series, with initial treatment by the lower level and secondary treatment by the upper level, the treated gas then exhausting through the exit vent 86. The gas can be moved at higher velocity through this multiple-stage biofiltration arrangement, then through a single-level biofilter covering the same ground area. However, gas can alternatively be introduced in parallel, with a gas entry to each level. In that case an additional plenum preferably is formed below the upper level, so that lower-level gas can be vented just above the lower-level biofilter material 64, and gas can be introduced just below the support bed 40a of the top level.

Figure 6:
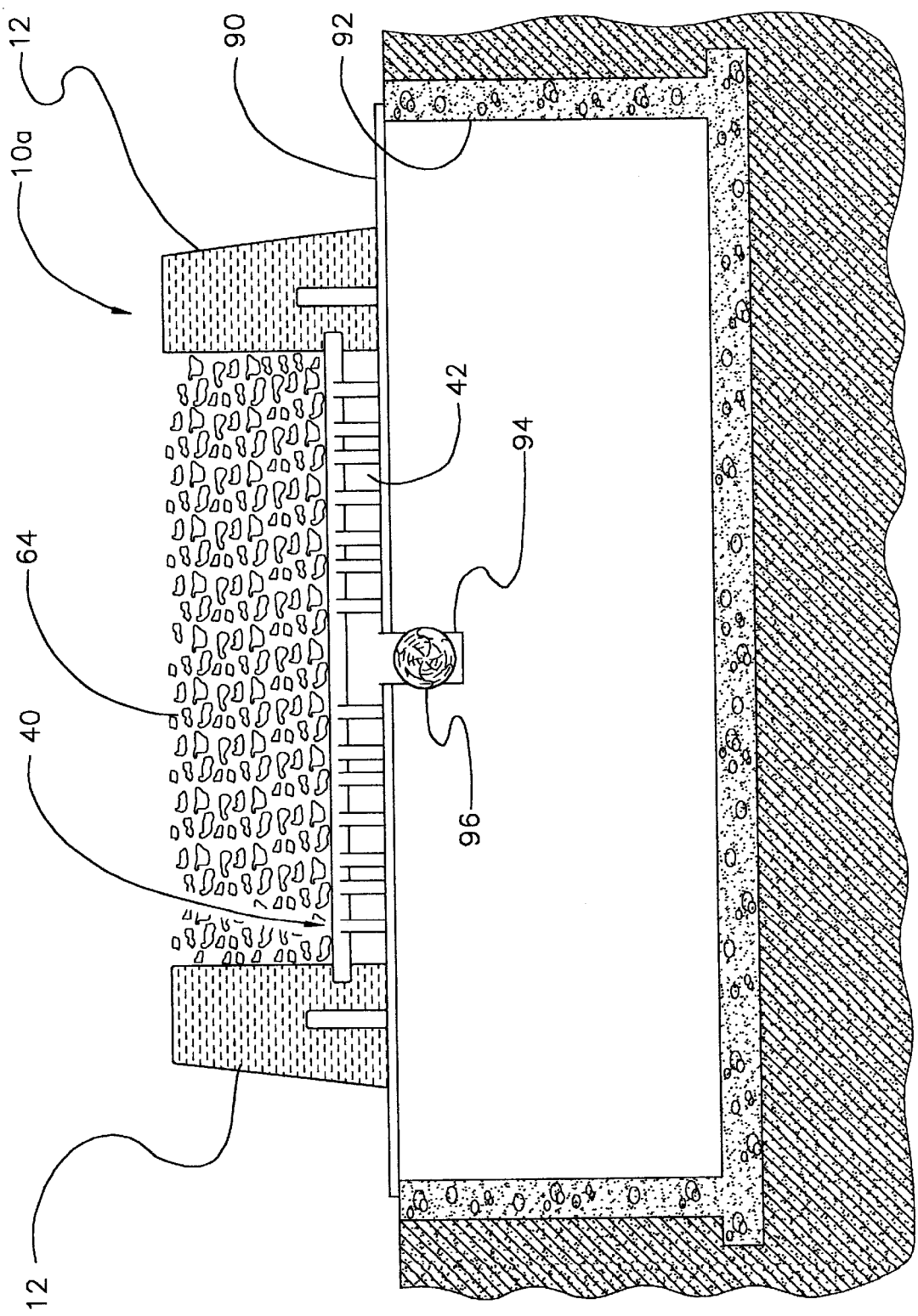
FIG. 6 is a schematic view, again in sectional elevation, showing a modular biofiltration system positioned on a cover of process tank which generates gases to be filtered.

FIG. 6 shows a further embodiment of the invention, in which a modular biofiltration system 10a is positioned and supported on a tank cover 90 covering a process tank 92. The tank 92 can be, for example, a digester tank, clarifier tank or part of a pumping station in a sewage treatment system or in sewage handling, or it can be a process tank for any of the processes mentioned above, producing any of the effluent gases listed above or any other gas treatable by biofiltration.

In the illustrated system the tank cover 90 is sufficiently strong to support the load of the biofiltration assembly 10a. The peripheral modules 12 may be filled to a lesser extent if desired, to reduce total weight on the cover assembly 90.

The biofiltration process in this embodiment occurs directly above the source of the contaminant gas. A simplified ducting arrangement is shown in FIG. 6, comprising a duct 94 (which can include a blower 96) leading directly from the interior of the tank 92 up into the plenum 42 of the modular assembly, the gas then to be distributed through the openings in the support bed 40, to pass upwardly through the bed of biofilter medium 64. Although a liner can be used (similar to the liner 30 shown in FIGS. 1–3), in this case there is no need for a barrier between the plenum 42 and the tank below, and the peripheral frame, comprising the modules 12, can simply be sealed against the surface of the tank cover assembly 90.

Figure 7:
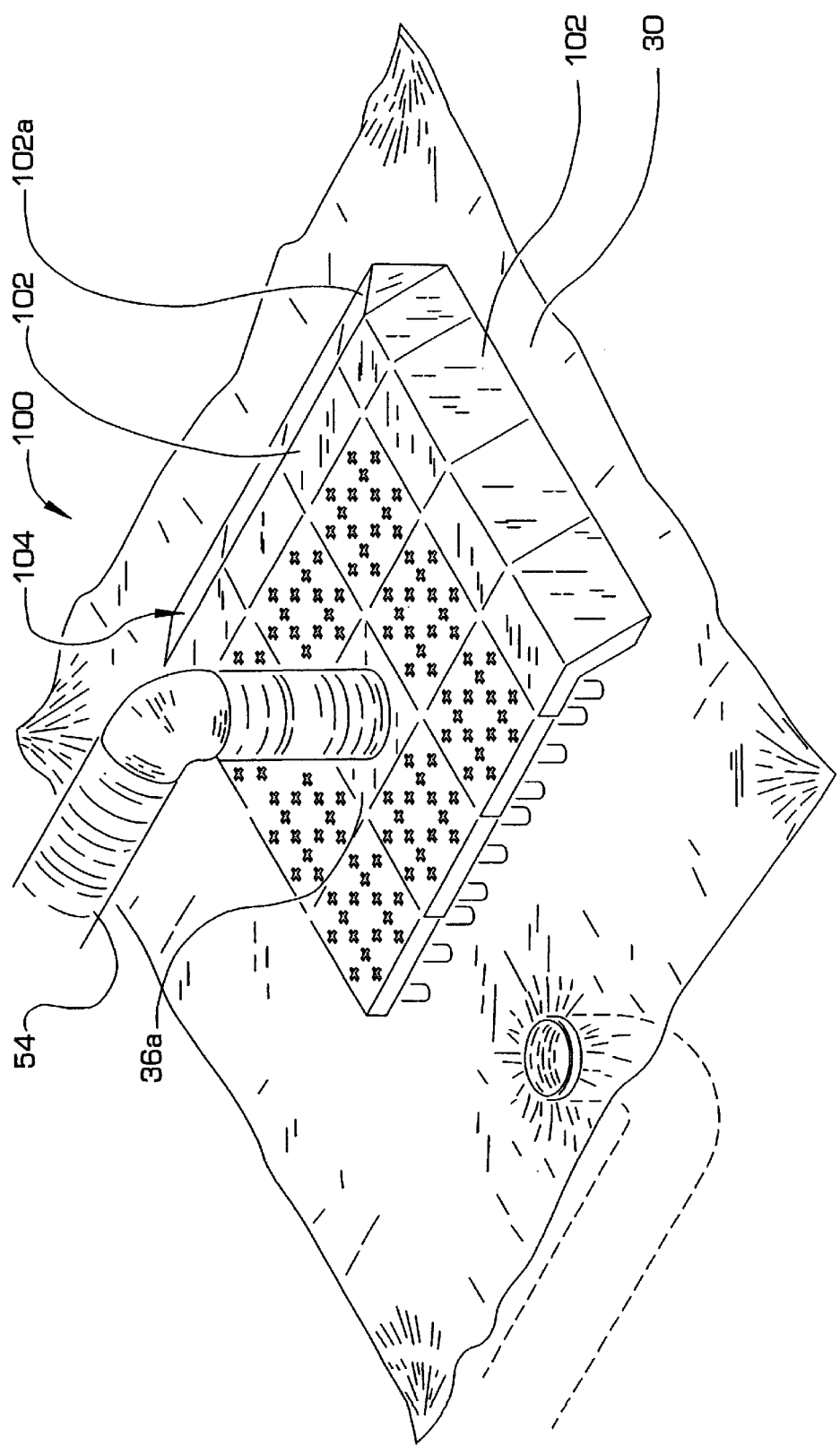
FIG. 7 is a view similar to FIG. 1, but showing a different form of the modular support system.

In FIG. 7 is shown a modified form of modular filtration support apparatus 100. The system of FIG. 7 is similar to that of FIG. 1 in many respects, the primary difference being the lack of tall peripheral modules such as the modules 12 shown in FIG. 1 that extend a substantial distance above the top of the bed platform modules 36 and 38 in that system. Instead, the system 100 preferably has edge platform modules 102, including corner edge platform modules 102a, to substantially close off the periphery of the plenum 42 defined beneath the bed platform modules 36. The assembly fragment shown in FIG. 7 is only a portion of the entire assembly.

Thus, a filter medium support bed 104 is capable of supporting a stack of biofiltration medium or other filter medium 106 in the manner shown in FIG. 8, stacked on the bed platform modules 36 and extending over the side edges or periphery of the support bed 104. The pile of filter medium 106 forms a natural slope 108, sloping back down to the base surface 110 on which the medium rests, and this base surface 110 can comprise a liner 30 over the ground or other surface as in FIG. 1.

The introduction of a withdrawal of gas into the plenum 42 formed underneath the platform bed 104 can be the same as described above, with a conduit 54 entering the plenum down through a non-perforated bed platform module 36a, or, as an alternative, through an underground or under-slab conduit which emerges through and is sealed to the liner 30 as shown at 60. Either of these conduits can alternatively be air withdrawal conduits, in the event the support bed 104 is used to support a compost pile, through which air is to be drawn downwardly and into the plenum 42, prior to exiting via the conduit 54 or 60.

It should be understood that the bed platform modules 36, which preferably assemble together in an interlocked fashion as described previously and shown in FIG. 2, can alone form the support bed 104, without any edge platform modules 102 closing the periphery of the plenum. This can be envisioned from FIG. 7, by simply removing the edge platform modules 102 and 102a. This arrangement, though not preferred, would rely on the filtration medium 106 as substantially closing the periphery of the plenum 42, simply by being piled over the edges of the support bed and sloping down to the base level 110 as in FIG. 8. FIG. 8 can be envisioned with the edge platform modules 102 removed. This arrangement, though effective, is not preferred because of the desire for generally even gas distribution. The gas will take the path of least resistance, and thus will be somewhat unevenly distributed in favor of the periphery of the plenum.

Figure 7A:
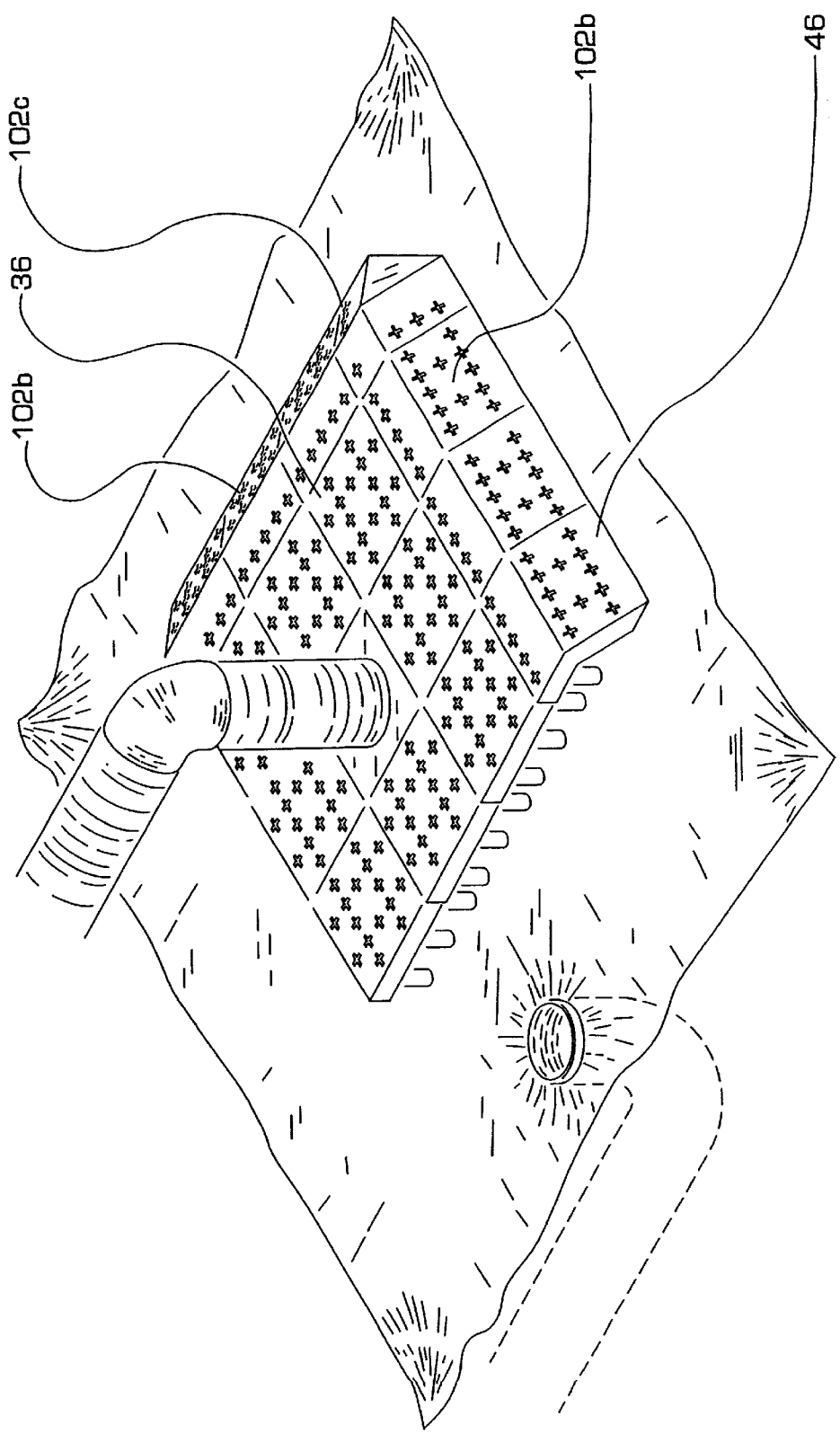
FIG. 7A is a view similar to FIG. 7 but showing a slight variation.

FIG. 7A shows the same system as in FIG. 7, but with edge platform modules 102b having perforations 46, as in the bed platform modules 36. This can include the corner edge platform modules 102c, as shown. As in the previous embodiment, modules near the periphery of the erected system can have reduced gas release area for purposes of achieving a generally even distribution. Thus, the non-perforated edge platform modules 102, 102a of FIG. 7 may be desirable in some circumstances, or the perforated modules 102b and 102c of FIG. 7A can have a smaller number or less total area of perforations per square foot in furtherance of achieving even distribution. Generally even distribution is desirable so as to use the biofiltration medium 106 to the maximum extent possible.

Figure 8A:
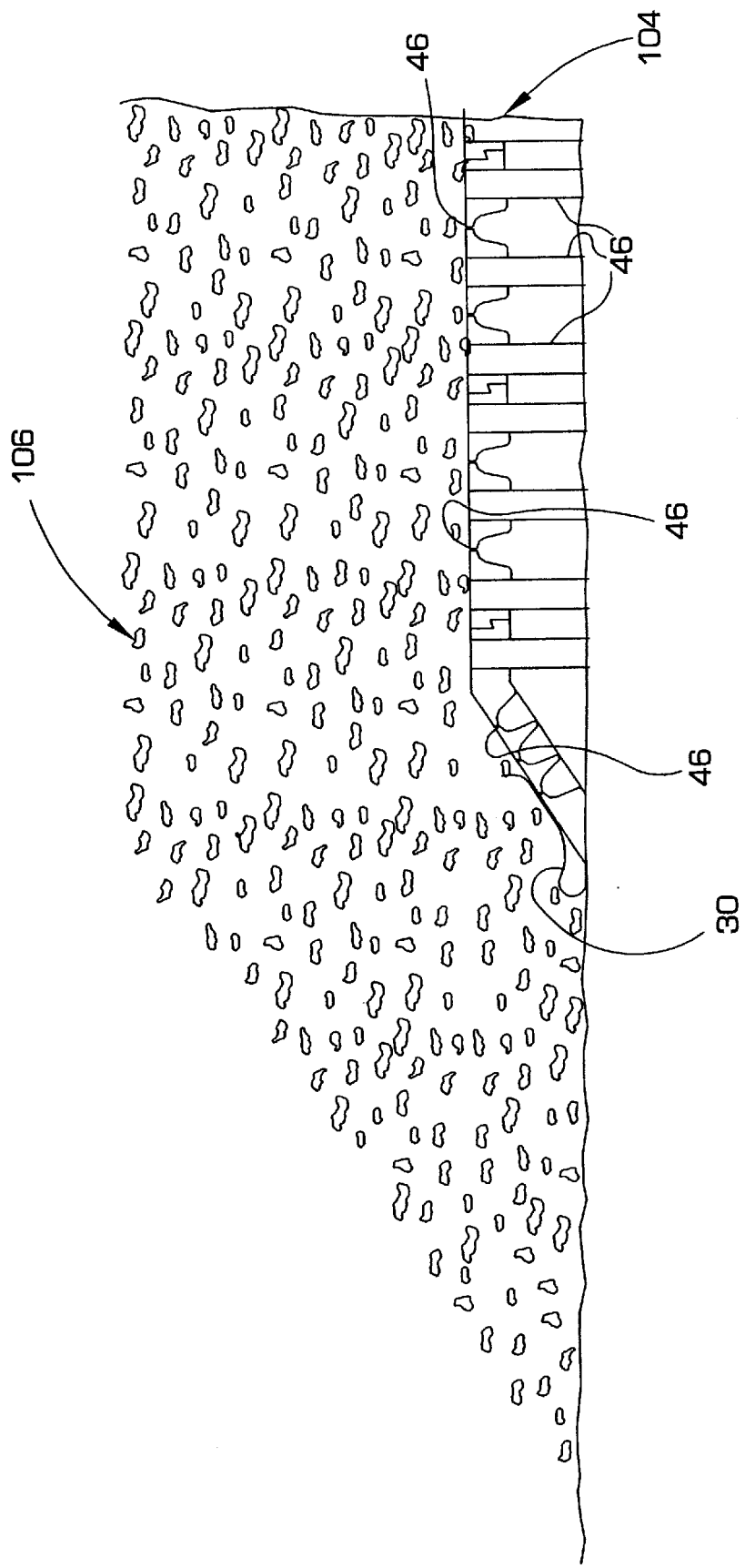
FIG. 8A is a view similar to FIG. 8 but showing a slight variation.

The schematic sectional view of FIG. 8A shows a form of edge platform module 102b having perforations 46.

Figure 9:
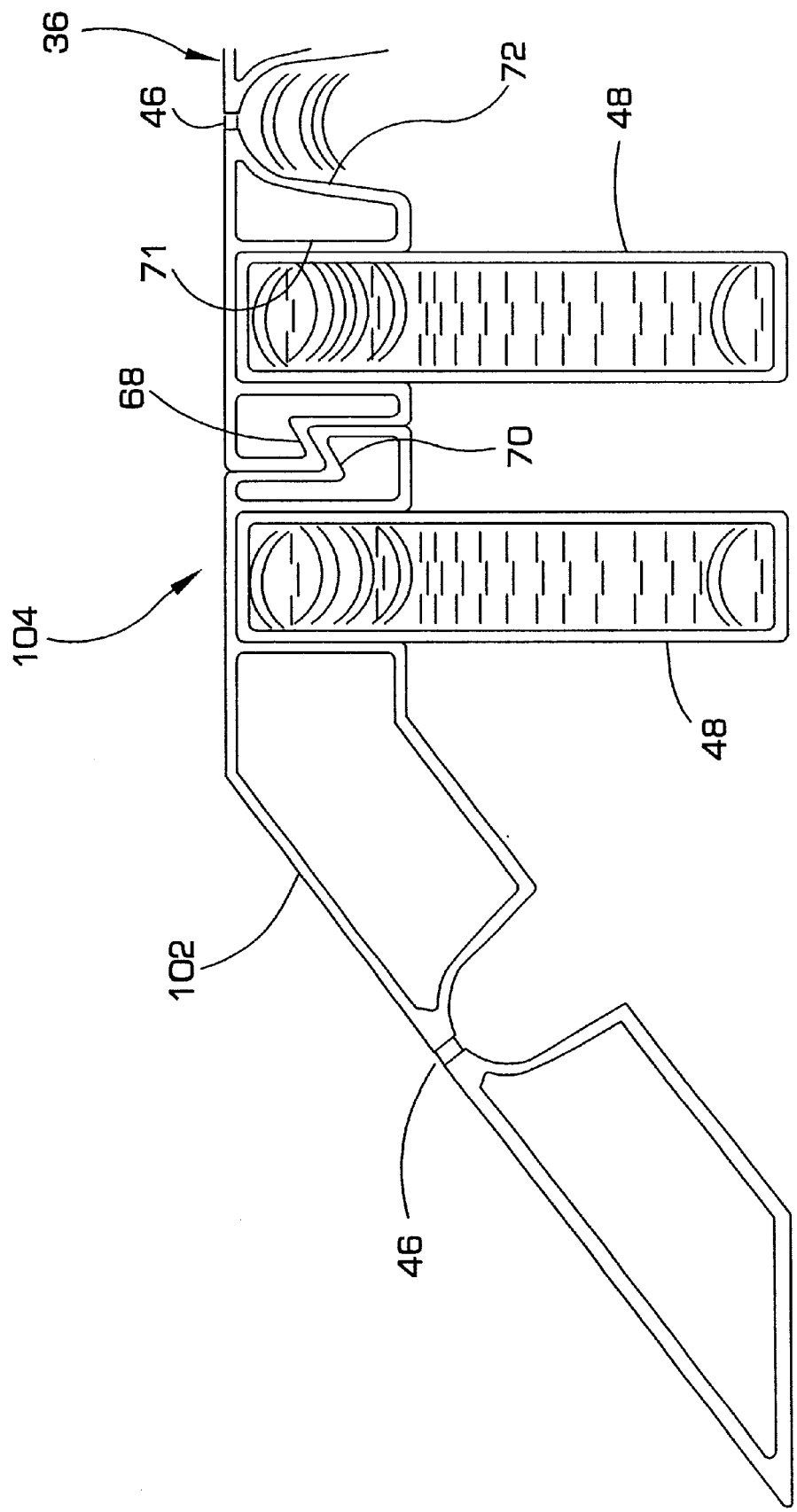
FIG. 9 is a more detailed cross-sectional view showing a portion of the erected system of FIGS. 7 and 8, at the edge of the filter bed platform.

FIG. 9 is a more detailed cross-sectional view showing a portion of the bed platform 104 at an edge, and showing an edge platform module 102 having a perforation 46. The supporting legs 48, sockets 71 for the legs, support arches 72 in the bed platform modules 36, and hook-type interconnections between modules, which can comprise downwardly hooked phalanges 68 and upwardly hooked phalanges 70 that engage as shown, preferably are the same as in the earlier described form of the invention. Although a leg 48 is shown supported in the edge platform module 102, such support could be eliminated, at least on two sides of the completed support bed, if the interlocking phalanges 68 and 70 are reversed in orientation.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A modular support apparatus for a biofiltration system that is used to filter and treat noxious or odorous gases passed through a bed of biofilter medium supported by the support apparatus, comprising:
   (a) a series of peripheral modules with means for assembling the modules end-to-end to form a free-standing peripheral frame surrounding a filtering area defined by interior sides of the peripheral modules when erected into said peripheral frame,
   (b) a multiplicity of polygonal bed platform modules having generally planar top surfaces and shaped to be arranged side-by-side contiguously to form a bed platform covering the entire filtering area within the peripheral frame, each bed platform module having leg-receiving recesses in a bottom side, and at least some of the bed platform modules being perforated so as to allow gas to pass vertically through,
   (c) module support means on the interior sides of the peripheral modules for engaging with and supporting edges of the bed platform modules to thereby provide partial support for those bed platform modules which are positioned at the periphery of the filtering area and adjacent to the peripheral frame, and
   (d) a multiplicity of bed support legs having upper ends sized and shaped to be closely received in the leg-receiving recesses in the bottom sides of the bed platform modules, and of length sufficient to support and elevate the bed platform modules above a base surface on which the support apparatus rests to form a plenum under the bed platform modules,
   the peripheral modules being substantially taller than the bed support legs such that the assembled modular support apparatus forms a large open-topped tray for supporting the bed of biofilter medium on a support surface formed by the multiplicity of bed platform modules with the peripheral frame extending above said support surface to contain the bed and with said plenum below the support surface and also bordered by said peripheral frame.

2. The apparatus of claim 1, wherein the module support means on the peripheral modules comprises a horizontally extending recess in the interior side of each of the peripheral modules and of a size to receive an edge of a bed platform module extending into the recess.

3. The apparatus of claim 1, wherein the bed platform modules are rectangular in shape.

4. The apparatus of claim 1, wherein the bed platform modules are square in shape.

5. The apparatus of claim 1 wherein the upper ends of said bed support legs are cylindrical in shape, and the leg receiving recesses in the bed platform modules being similarly shaped.

6. The apparatus of claim 1, further including direction vanes secured to at least some of the bed support legs within said plenum, the vanes being adjustable in their orientation from the legs such as to be capable of being oriented in such a way as to direct gases to be generally evenly distributed within the plenum and generally balanced in flow rate through the bed of biofilter medium.

7. The apparatus of claim 6, wherein the bed support legs are generally cylindrical in shape, and wherein the vanes include a collar fitted closely over the leg, with a generally planar gas-directing vane portion secured to the collar such that the collar can be manually rotated to orient the vane portion in the desired direction.

8. The apparatus of claim 1, further including a flexible and substantially gas-imperforate liner cooperating with the free standing peripheral frame to contain gases from escaping said plenum except through the bed of biofilter medium, the liner lying on said base surface on which the apparatus rests and secured to the peripheral modules of the peripheral frame by gas-tight securing means.

9. The apparatus of claim 8, wherein the gas-tight securing means comprises a generally slot-shaped recess extending up into the bottom side of each of the peripheral modules and extending in a lengthwise direction relative to the peripheral modules, the flexible liner extending up into the slot-like recesses substantially entirely around the peripheral frame, and a liner retainer block being press-fit against the liner and up in the slot-shaped recess, thus substantially sealing the liner against the interior of the slot-shaped recess.

10. The apparatus of claim 1, wherein the means for assembling the peripheral modules comprises interlocking means for engaging a first end of one peripheral module with a second end of another peripheral module in such a way as to prevent rotation between the connected modules about a vertical axis and for providing a stable connection between adjacent modules so as to provide a unified peripheral frame.

11. The apparatus of claim 10, wherein the interlocking means comprises, on substantially each peripheral module, a generally cylindrical socket oriented vertically at said first end of the peripheral module and a mating generally cylindrical dowel oriented vertically on said second end of the peripheral modules, so configured and positioned that one peripheral module can be assembled to another peripheral module by elevating the one peripheral module above the second peripheral module, then lowering one peripheral module with its dowel oriented over the socket of the other peripheral module until the modules are at a common level with the dowel locked tightly in the socket.

12. The apparatus of claim 1, wherein the bed platform modules include non-perforated platform modules, located around the periphery of the filtering area so as to help direct incoming gases away from the periphery of the plenum.

13. The apparatus of claim 1, wherein the bed platform modules have perforations configured in "X" shapes.

14. The apparatus of claim 1, wherein each bed platform module has support structure on the bottom of the platform module, extending downwardly and providing flexure strength in the module, the downwardly extending support structure also forming the leg-receiving recesses.

15. The apparatus of claim 1, wherein the bed platform modules have means for interlocking with adjacent, contiguous bed platform modules.

16. The apparatus of claim 1, further including means for stacking multiple levels of said bed platform modules to support multiple levels of biofilter medium, including means for stacking multiple levels of the peripheral modules.

17. The apparatus of claim 1, in combination with a tank in which noxious or odorous gases are contained, the tank having a structural tank cover and the modular support apparatus being positioned on top of the cover, and including means for delivering gases from the tank up into the plenum under the bed platform modules.

18. A modular support apparatus for supporting a bed of organic material through which air or gas is to be passed vertically, comprising:
(a) a series of peripheral modules with means for assembling the modules together to form a free-standing peripheral frame surrounding a filtering area defined by interior sides of the peripheral modules when erected into said peripheral frame,
(b) a multiplicity of polygonal bed platform modules having generally planar top surfaces and shaped to be arranged side-by-side contiguously to form a bed platform covering the entire filtering area within the peripheral frame, and at least some of the bed platform modules being perforated so as to allow gas to pass vertically through, and
(c) platform support means for supporting and elevating the bed platform modules above a base surface on which the support apparatus rests to form a plenum under the bed platform modules,
the peripheral modules being substantially taller than said platform support means such that the assembled modular support apparatus forms a large open-topped tray for supporting the bed of organic material on a support surface formed by the multiplicity of bed platform modules with the peripheral frame extending above said support surface to contain the bed of material and with said plenum below the support surface and also bordered by said peripheral frame.

19. The apparatus of claim 18, further including a bed of biofilter medium contained within the modular support apparatus, resting on the bed platform and contained by the peripheral frame, thus forming a biofiltration system, and including means for moving noxious or odorous gases into said plenum for passage up through the biofilter medium.

20. The apparatus of claim 18, further including a bed of compost material contained within the modular support application, resting on the bed platform and contained by the peripheral frame, and including means for moving air down through the compost material, into the plenum and out of the plenum.

21. A modular support apparatus for supporting a bed of organic material through which air or gas is to be passed vertically, comprising:
(a) a multiplicity of polygonal bed platform modules having generally planar top surfaces and shaped to be arranged side-by-side contiguously to form a filter bed platform covering a filtering area, at least some of the bed platform modules being perforated so as to allow gas to pass through the filter bed platform,
(b) a multiplicity of bed support legs having upper ends engaged with bottom sides of the bed platform modules, and of length sufficient to support and elevate the bed platform modules above a base surface on which the support apparatus rests to form a plenum under the bed platform modules, and
(c) peripheral means for generally closing the plenum around the periphery of the filter bed platform,
whereby the assembled modular support apparatus can support a bed of organic material above said plenum, with the organic material stacked on the filter bed platform, such that gases can be directed into the plenum and up through the bed of organic material.

22. The apparatus of claim 21, further including a bed of biofilter medium supported on the modular support apparatus, resting on the bed platform and thus forming a biofiltration system, and including means for moving noxious or odorous gases into said plenum for passage up through the biofilter medium.

23. The apparatus of claim 22, wherein the bed of biofilter medium is stacked on the filter bed platform and over the edges of the platform, sloping down to the base surface.

24. The apparatus of claim 21, wherein said peripheral means comprises edge platform modules configured to be positioned contiguously against the bed platform modules at edges of the filter bed platform, the edge platform modules having a slope to form a surface that slopes from the filter bed platform generally down to the base surface, so that the bed of biofilter medium can be stacked on the filter bed platform and over its edges, supported also on the edge platform modules.

25. The apparatus of claim 24, wherein at least some of the edge platform modules are perforated so as to allow gas to pass through.

26. The apparatus of claim 21, further including a bed of compost material supported on the modular support apparatus, resting on the bed platform, and including means for moving air down through the compost material, into the plenum and out of the plenum.

27. The apparatus of claim 21, wherein the bed platform modules have leg-receiving recesses in the bottom sides of the bed platform modules, sized and shaped to closely receive upper ends of the legs.

28. The apparatus of claim 21, further including direction vanes secured to at least some of the bed support legs within said plenum, the vanes being adjustable in their orientation from the legs such as to be capable of being oriented in such a way as to direct gases to be generally evenly distributed within the plenum and generally balanced in flow rate through the bed of biofilter medium.

29. The apparatus of claim 28, wherein the bed support legs are generally cylindrical in shape, and wherein the vanes include a collar fitted closely over the leg, with a generally planar gas-directing vane portion secured to the collar such that the collar can be manually rotated to orient the vane portion in the desired direction.

30. The apparatus of claim 21, further including a flexible and substantially gas-imperforate liner lying against the base surface beneath the modular support apparatus, to substantially contain gases from escaping said plenum except through the bed of biofilter medium.

* * * * *